US006966671B2

(12) United States Patent
Lee et al.

(10) Patent No.: US 6,966,671 B2
(45) Date of Patent: Nov. 22, 2005

(54) ADJUSTING APPARATUS FOR PROJECTION LAMP

(75) Inventors: Sea-Huang Lee, Chu-Nan (TW); Shou-Chih Chen, Chu-Nan (TW)

(73) Assignee: Coretronic Corporation, Miao-Li Hsien (TW)

( * ) Notice: Subject to any disclaimer, the term of this patent is extended or adjusted under 35 U.S.C. 154(b) by 89 days.

(21) Appl. No.: 10/707,279

(22) Filed: Dec. 3, 2003

(65) Prior Publication Data

US 2004/0165386 A1  Aug. 26, 2004

(30) Foreign Application Priority Data

Dec. 5, 2002  (TW) .............................. 91220106 U

(51) Int. Cl.[7] ............................................. F21V 14/00
(52) U.S. Cl. ........................ 362/285; 362/277; 362/319
(58) Field of Search ................................ 362/285, 277, 362/280, 282, 319, 321–324; 353/85, 87

(56) References Cited

U.S. PATENT DOCUMENTS 6,000,802 A * 12/1999 Hashizume et al. .......... 353/38
6,837,596 B2 * 1/2005 Tanaka et al. .............. 362/277

* cited by examiner

*Primary Examiner*—John Anthony Ward
*Assistant Examiner*—Mark Tsidulko
(74) *Attorney, Agent, or Firm*—Winston Hsu

(57) ABSTRACT

An adjusting apparatus for a projection lamp has a base, an adjusting module, and a pair of adjusting device and repositioning device, which are on the opposite surfaces of the base. The adjusting module has a plurality of adjusting plates that are combined by the guide-grooves and guide-pins. A projection lamp is fixed to an end of the adjusting module. As using the adjusting device and the repositioning device for adjusting the position of the projection lamp, the projection lamp can be achieved the two-dimensional adjustment and the projection system can reduce the illumination loss.

19 Claims, 16 Drawing Sheets

ADJUSTING APPARATUS FOR PROJECTION LAMP

BACKGROUND OF INVENTION

1. Field of the Invention

The present invention relates to an adjusting apparatus, and more particularly to an adjusting apparatus for a projection lamp in the projection apparatus.

2. Description of the Prior Art

Referring to FIG. 1 and FIG. 2, a light source 10 for use in a projection apparatus of the prior art includes a lamp 11 and a tray 12 screwed to a front end of the lamp 11. The lamp 11 is directly fixed upon the tray 12 by bolts 13, then, the tray 12 slid into a base container (not shown in drawing), and put into a projector. Hence, the position of the light source 10 can't be adjusted.

Referring to FIG. 3, a projection apparatus currently uses the sequential color recapture skill for raising the illumination efficiency. The projection apparatus 1 places a reflection mirror 4 in an entrance 3 of an integration rod 2. Therefore, the beam of light provided by the light source 5 can only impinge through a small opening 6 on the central part of the integration rod 2. Hence, the focus of the light source 5 must precisely focus on the central part of the integration rod 2 to reduce the illumination loss. But the light source 10 of the prior art (shown in FIG. 1) can't provide a mechanism for adjusting the position of the light source 10. As a result, after putting the light source 10 into the projector, the light can't adjust to precisely focus the central part of the integration rod 2 so that must reset up the light source 10 to prevent the illumination loss.

SUMMARY OF INVENTION

An object of the present invention is to provide an adjusting apparatus for a projection lamp, which uses the adjusting devices and repositioning devices to control and adjust the position of the lamp.

Another object of the present invention is to provide an adjusting apparatus for a projection lamp, after putting the lamp inside the projection apparatus, the position of the lamp can be adjusted by means of rotating the adjusting devices to for focusing the light and reducing the illumination loss.

To achieve the above and other objects, the present invention provides an adjusting apparatus for a projection lamp comprising a base, an adjusting module having a plurality of adjusting plates, and a cover. The base has a container and upon which has adjusting devices and repositioning devices. The adjusting devices are pressed to the adjusting plate to push the lamp to axis displacement. One end of the repositioning device is fixed to the side surface of the lamp and the other end is pressed to the side surface of the adjusting plate to elastic push the lamp return. The adjusting module is placed inside the container. Among the plurality of adjusting plates, they forms guide-grooves and guide-pins according to each other. A guide-pins form on an adjusting plate in accordance with the guide-grooves of the base. By means of the guide-pins and the guide-grooves, the adjusting module connect to the base, and then, the cover is screwed to the top surface of the container to form the adjusting apparatus for a projection lamp.

BRIEF DESCRIPTION OF DRAWINGS

The above and other objects, advantages, and features of the present invention will be understood from the following detailed description of the invention when considered in connection with the accompanying drawings below.

DETAILED DESCRIPTION

Figure 1:
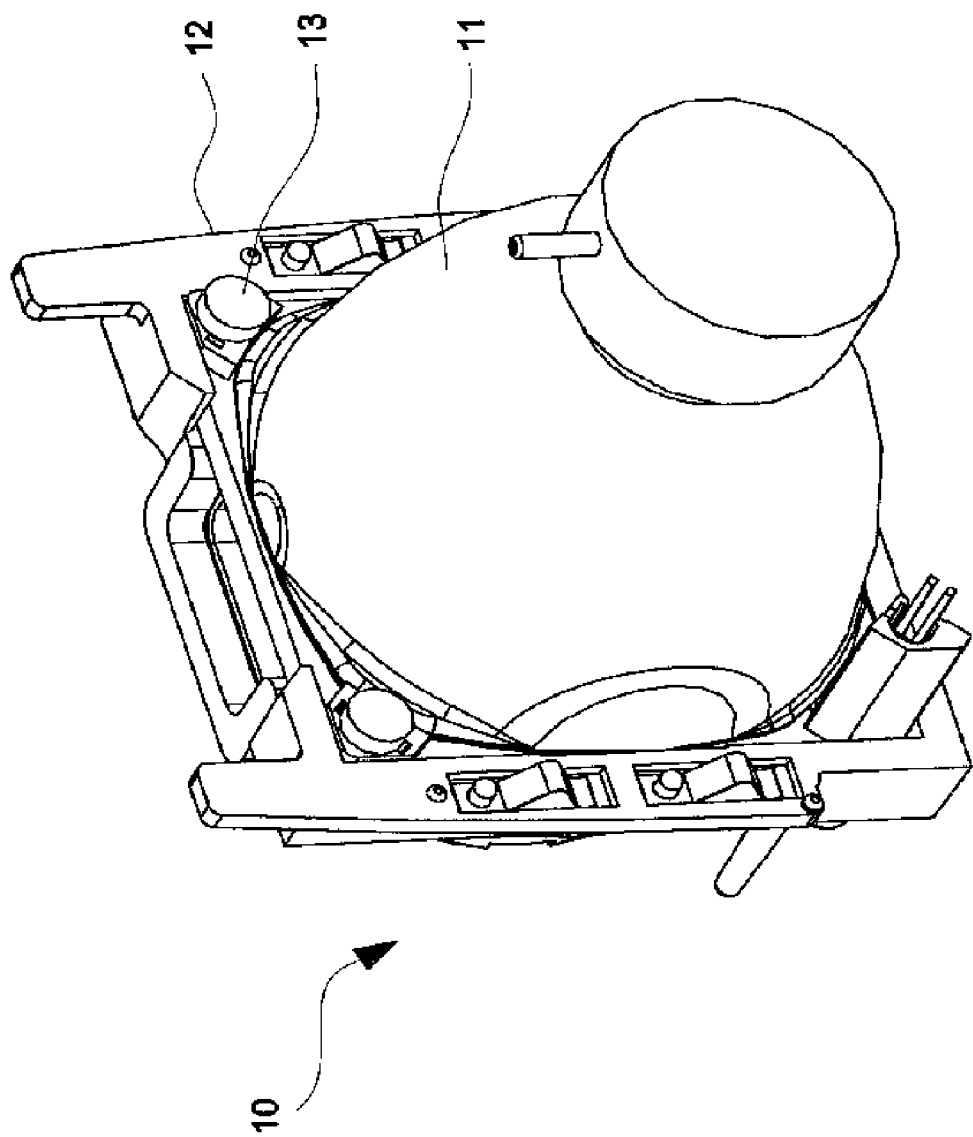
FIG. 1 is a perspective view showing a light source of the prior art.
Figure 2:
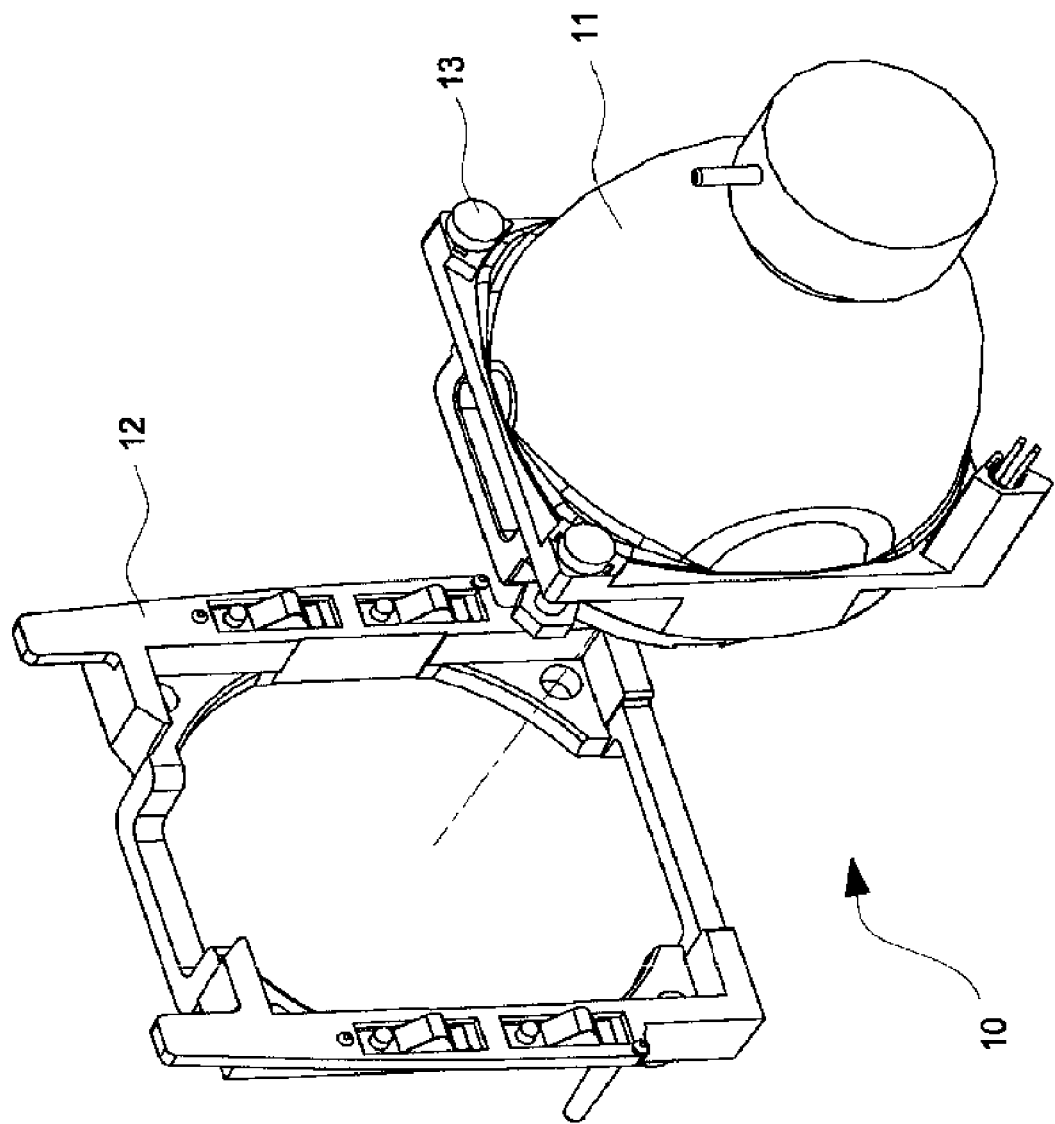
FIG. 2 is an explored view showing a light source of the prior art.
Figure 3:
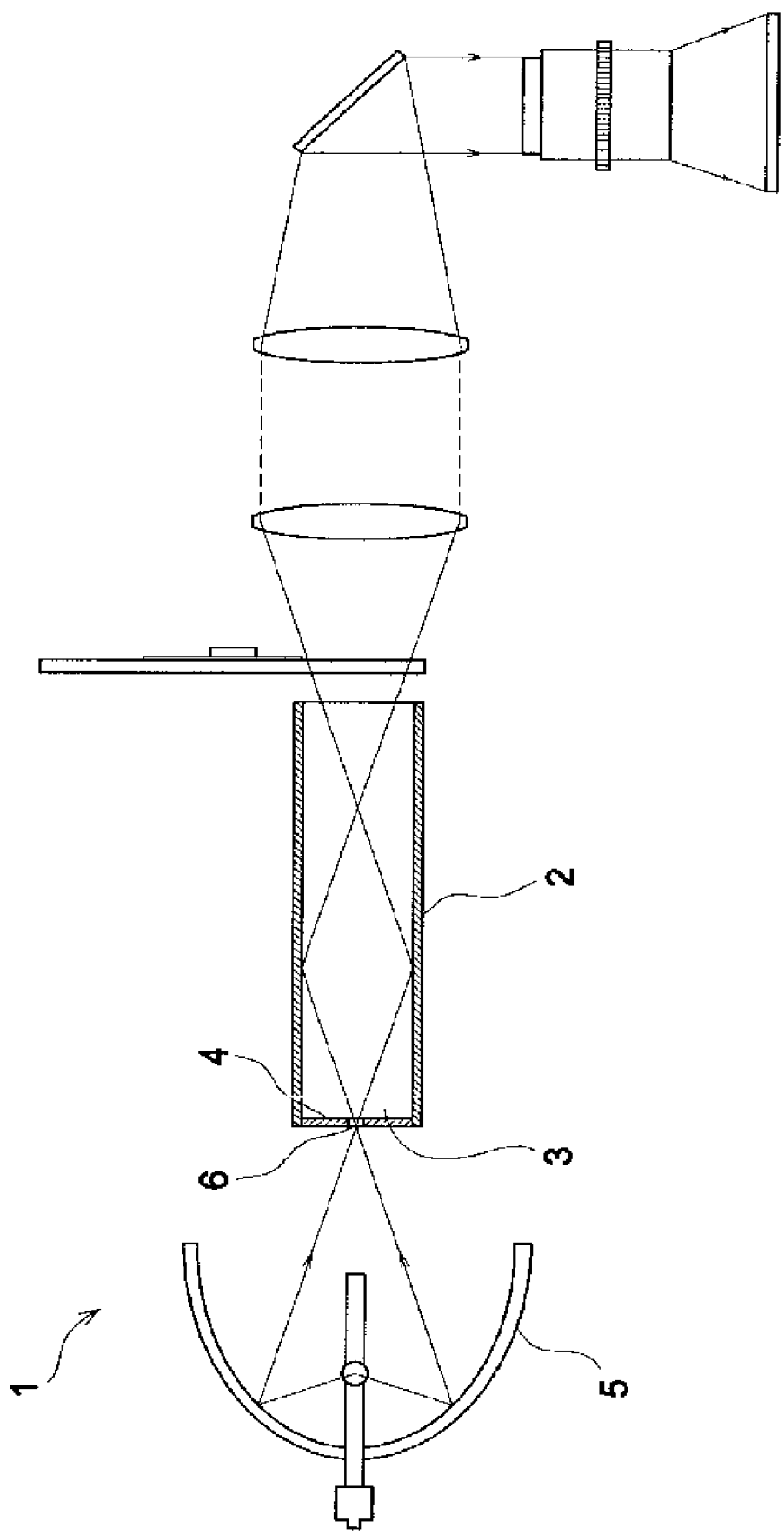
FIG. 3 is a schematic view showing a prior art projection apparatus with the sequential color recapture skill.
Figure 4:
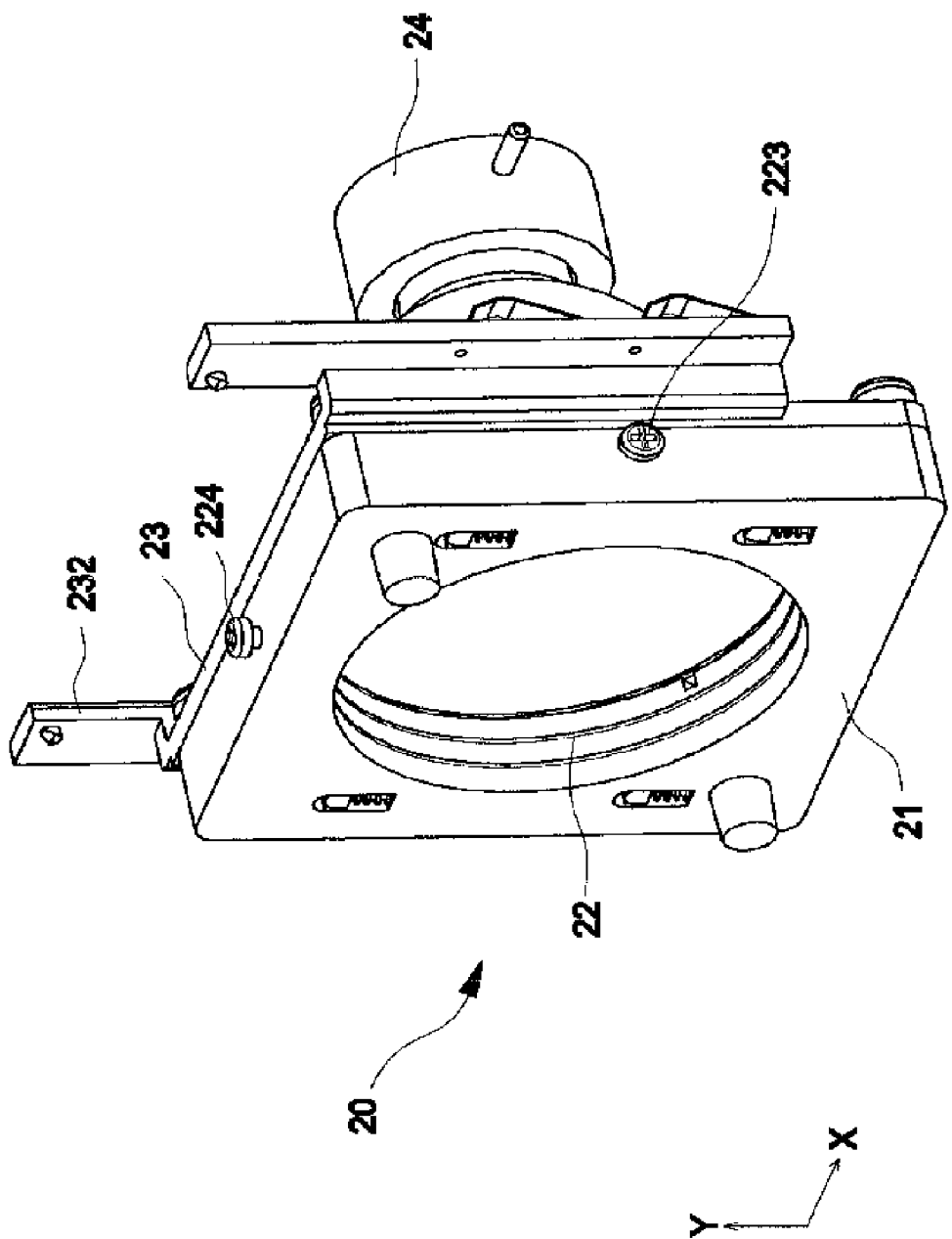
FIG. 4 is a perspective view showing an adjusting apparatus for a projection lamp of the first embodiment of the present invention.
Figure 5A:
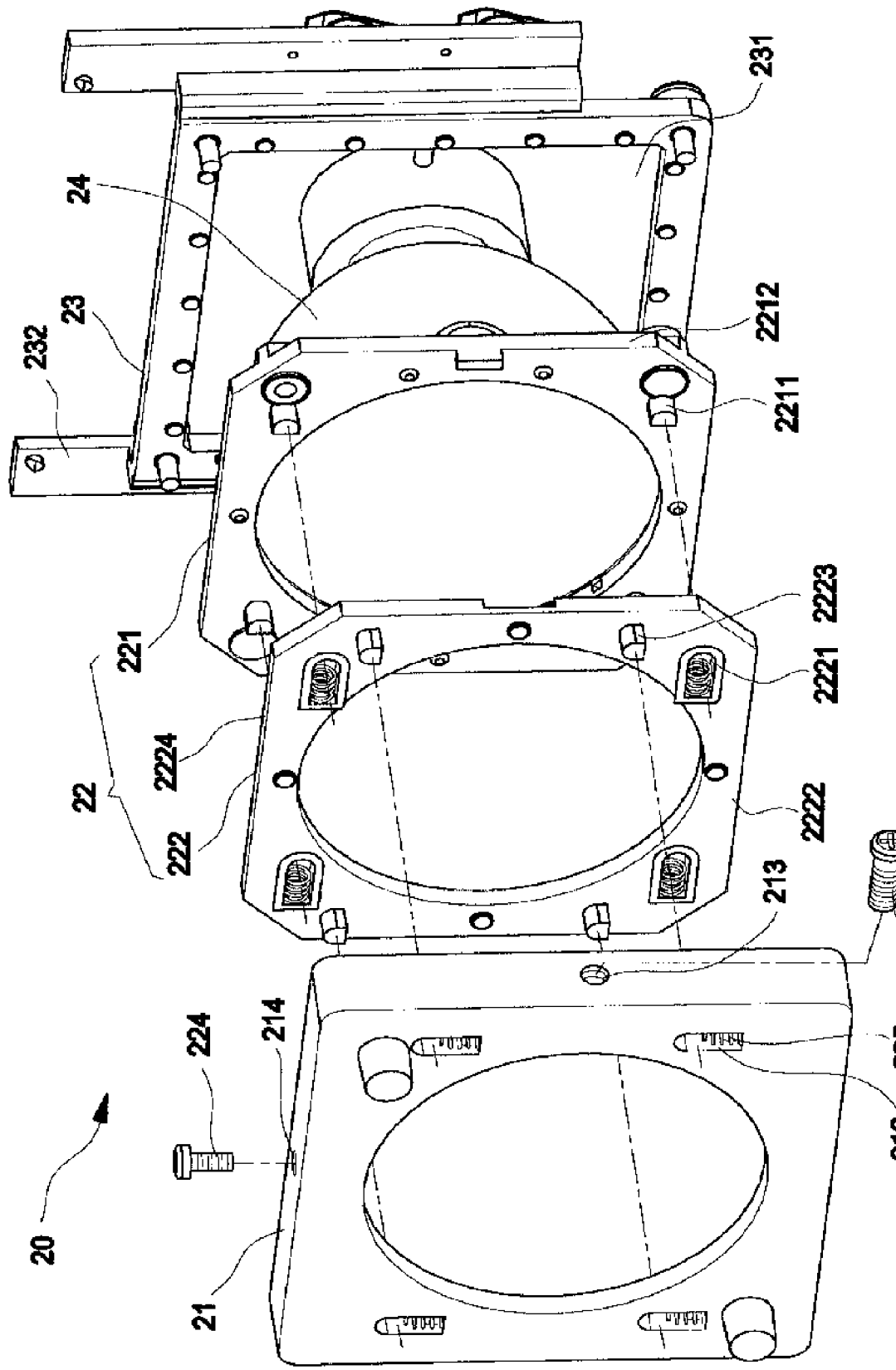
FIG. 5A is an explored view showing an adjusting apparatus for a projection lamp of the first embodiment of the present invention.
Figure 5B:
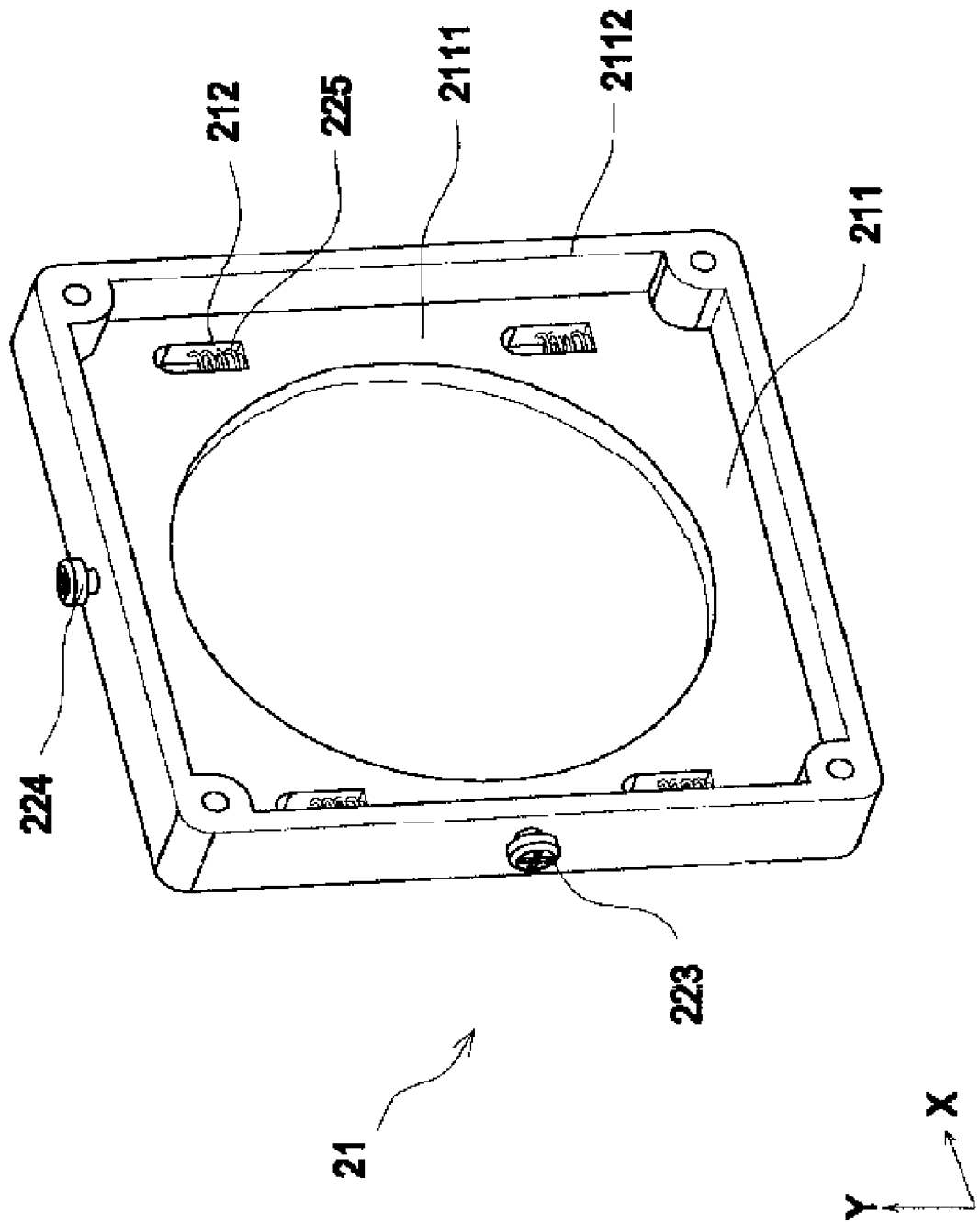
FIG. 5B is a perspective view showing a base of the first embodiment of the present invention.

The First Embodiment:

Referring to FIG. 4, FIG. 5A, and FIG. 5B, an adjusting apparatus 20 for a projection lamp comprises a base 21, an adjusting module 22, and a cover 23. The adjusting module 22 connects to a lamp 24.

The base 21 is a rectangular body and has a container 211 at the central part (shown in FIG. 5B) slightly bigger than the dimensions of the adjusting module 22. A bottom 2111 of the container 211 has a plurality of Y-axis rectangular guide-grooves 212.

The adjusting module 22 is placed inside the container 211 of the base 21. The adjusting module 22 comprises an X-axis adjusting plate 221 and a Y-axis adjusting plate 222. An X-axis guide-pins 2211 and X-axis rectangular guide-grooves 2221 on corresponding positions are respectively placed on the X-axis adjusting plate 221 and Y-axis adjusting plate 222. A surface 2222 of the Y-axis adjusting plate 222, which faced the bottom 2111 of the container 211, forms Y-axis guide-pins 2223 in accordance with the Y-axis rectangular guide-grooves 212. By placing the guide-pins into the guide-grooves, the Y-axis adjusting plate 222 connects with the base 21 and the X-axis adjusting plate 221 connects with Y-axis adjusting plate 222. The X-axis adjusting plate 221 is screwed to one end of the illumination lamp 24 by means of the bolts.

The cover 23 is screwed to a top surface 2112 of the container 211 of the base 21 and the central part of the cover 23 has a window 231. The dimensions of the window 231 are smaller than the dimensions of the adjusting plates 221 and 222 so that limits the adjusting apparatus 22 to move inside the container 211.

In addition, the adjacent surfaces of the base 21 respectively have an X-axis adjusting opening 213 and a Y-axis adjusting opening 214 passed by an X-axis adjusting device 223 and a Y-axis adjusting device 224 each to adjust the X-axis and the Y-axis displacement of the lamp 24. The X-axis adjusting device 223 is parallel to the length direction of the X-axis rectangular guide-grooves 2221 and is screwed to the X-axis adjusting opening 213, which has one end pressed to a side surface 2212 of the X-axis adjusting plate 221. The Y-axis adjusting device 224 is parallel to the length direction of the Y-axis rectangular guide-grooves 212 and is screwed to the Y-axis adjusting opening 214, which has one end pressed to a side surface 2224 of the Y-axis adjusting plate 222. In side the X-axis rectangular guide-grooves 2221 and the Y-axis rectangular guide-grooves 212 have repositioning devices 225. One end of the repositioning device 225 perpendicularly presses to the guide-pin and the other end presses to the guide-groove surface. The repositioning devices 225 could be springs.

Figure 6:
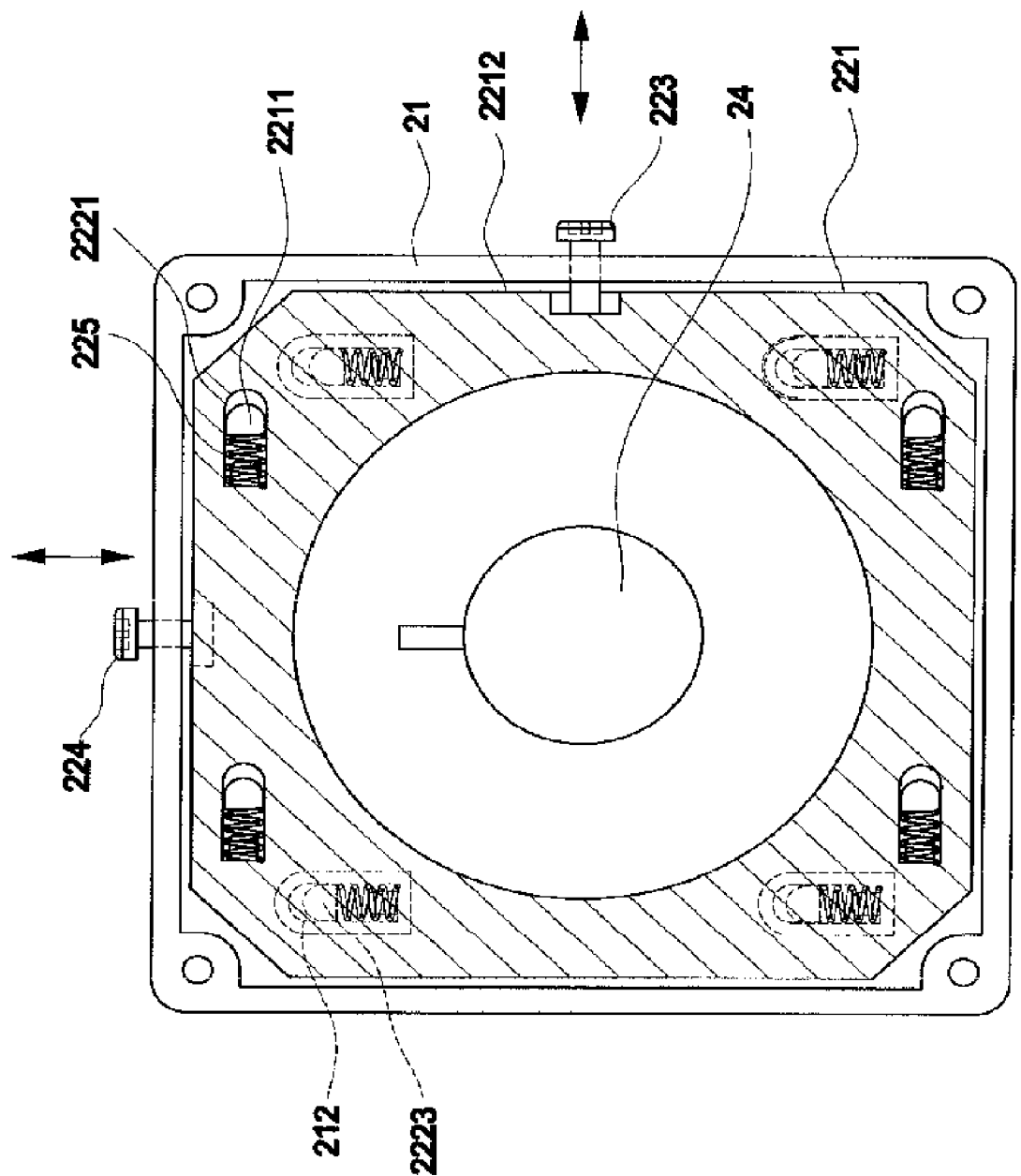
FIG. 6 is a schematic view showing the motion of an adjusting apparatus for a projection lamp of the first embodiment of the present invention.

Referring to FIG. 6, as rotating the X-axis adjusting device 223, the X-axis adjusting device 223 pushes the X-axis adjusting plate 221. Due to the X-axis guide-pins 2211 are limited to move inside the X-axis rectangular guides-grooves 2221 and push the lamp 24 forward along the length direction of the X-axis rectangular guides-grooves 2221 to adjust the X-axis displacement of the lamp 24. Meanwhile, the guide-pins 2211 compress the repositioning devices 225. On the contrary, when reversely rotating the X-axis adjusting device 223, the repositioning devices 225 elastically push the X-axis adjusting plate 221 and push the lamp 24 to reversal displacement. As rotating the Y-axis adjusting device 224, the Y-axis adjusting device 224 push the Y-axis adjusting plate 222. Due to the Y-axis guide-pins 2223 are limited to move inside the Y-axis rectangular guides-grooves 212, and the lamp 24 is pushed forward along the length direction of the Y-axis rectangular guides-grooves 212 to adjust the Y-axis displacement of the lamp 24. Meanwhile, the guide-pins 2223 compress the repositioning devices 225. On the contrary, when reversely rotating the Y-axis adjusting device 224, the repositioning devices 225 elastically push the Y-axis adjusting plate 222, and the lamp 24 is pushed to reversal displacement. As a result, the lamp can adjust axially displacement by means of the above-mentioned adjusting way.

In addition, the two opposite sides of the cover 23 have sliding-plates 232 to screw the cover 23 to the base 21. By means of the sliding-plates 232 slides into the cavity (not shown in drawing) of the projection apparatus to fix and, then by means of pressing the X-axis adjusting device 223 and the Y-axis adjusting device 224 adjusts the position of the lamp 24 to focus the light of the lamp 24 and reduce the illumination loss.

Second Embodiment

Figure 7:
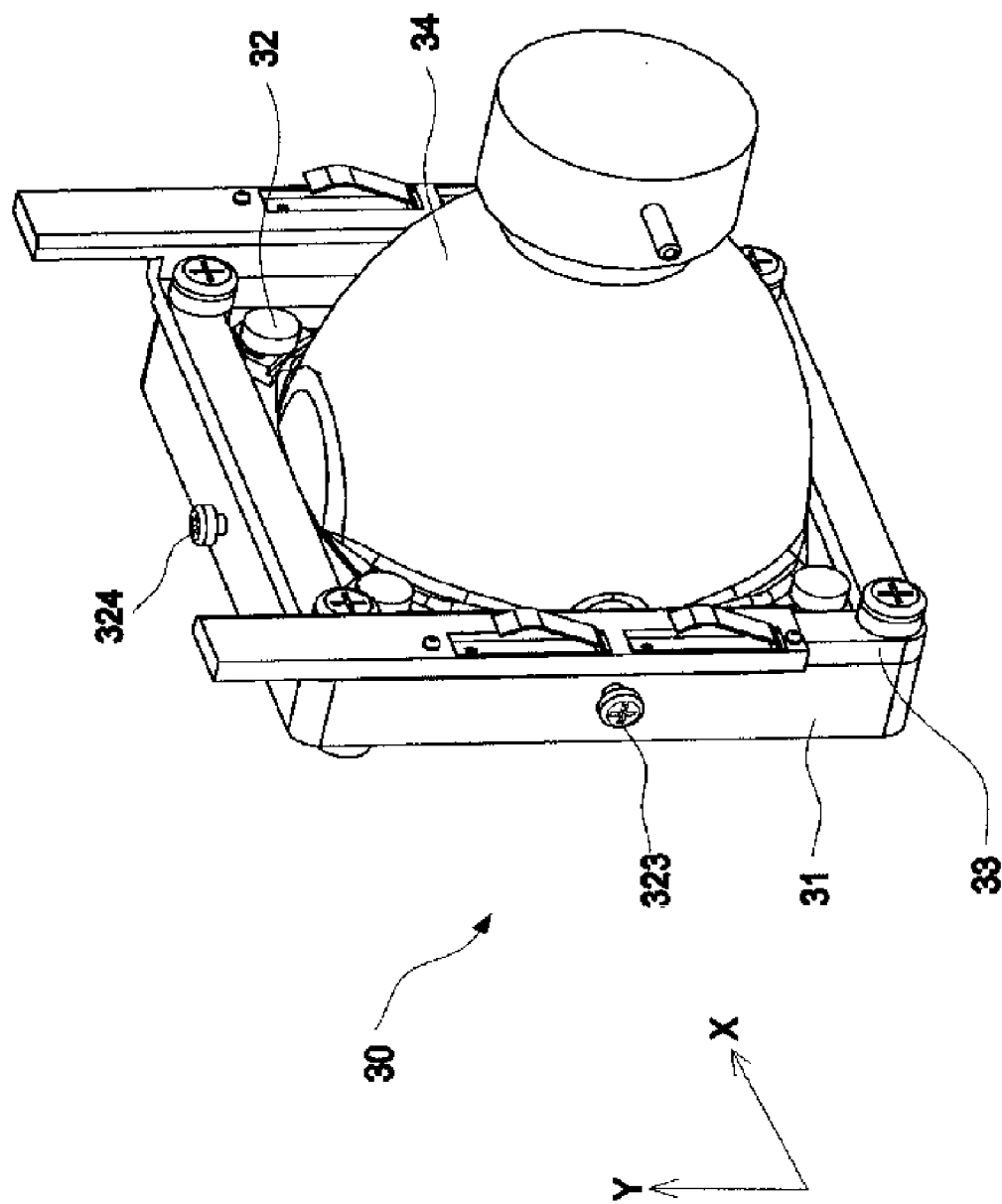
FIG. 7 is a perspective view showing an adjusting apparatus for a projection lamp of the second embodiment of the present invention.
Figure 8A:
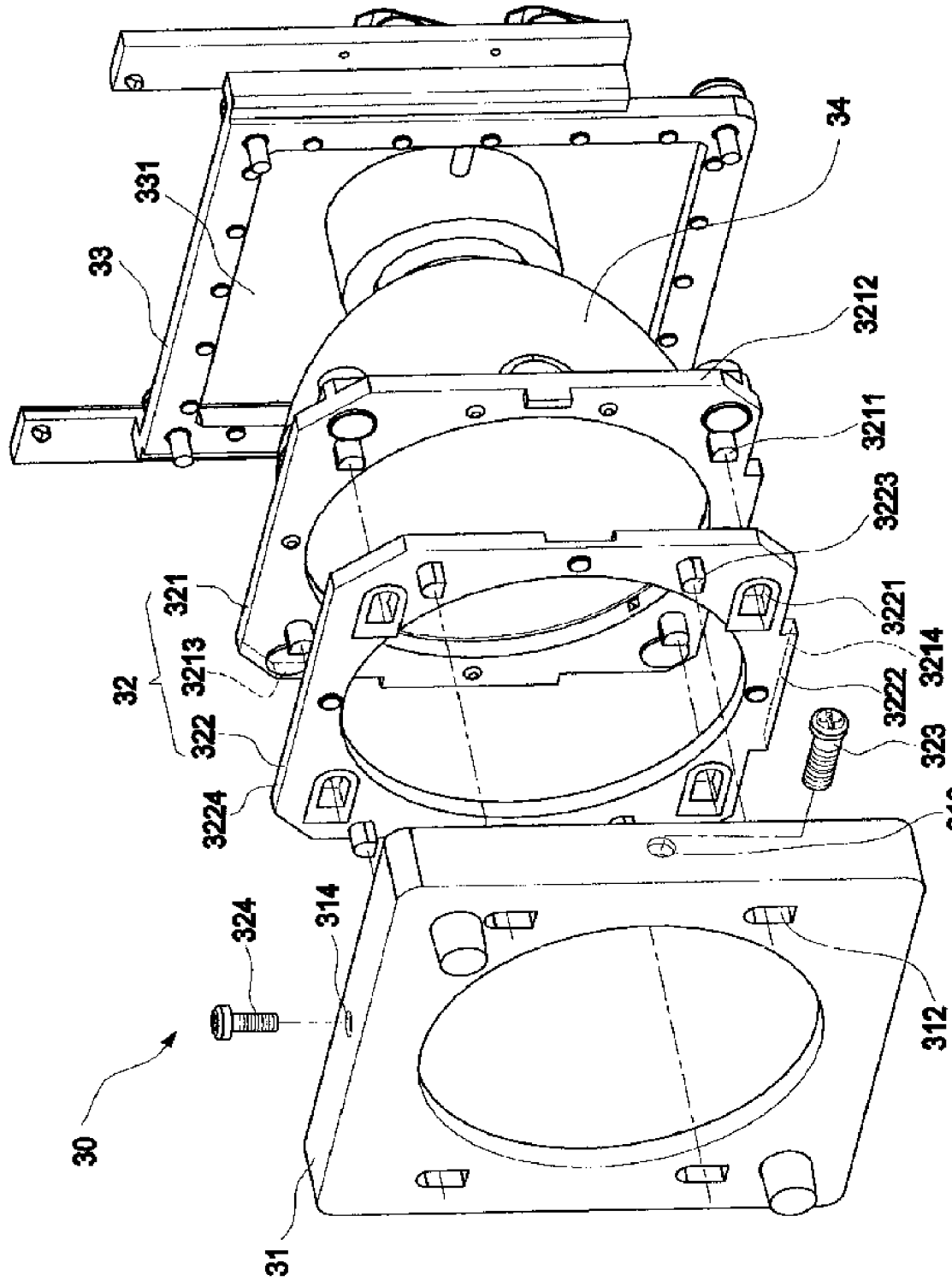
FIG. 8A is an explored view showing an adjusting apparatus for a projection lamp of the second embodiment of the present invention.
Figure 8B:
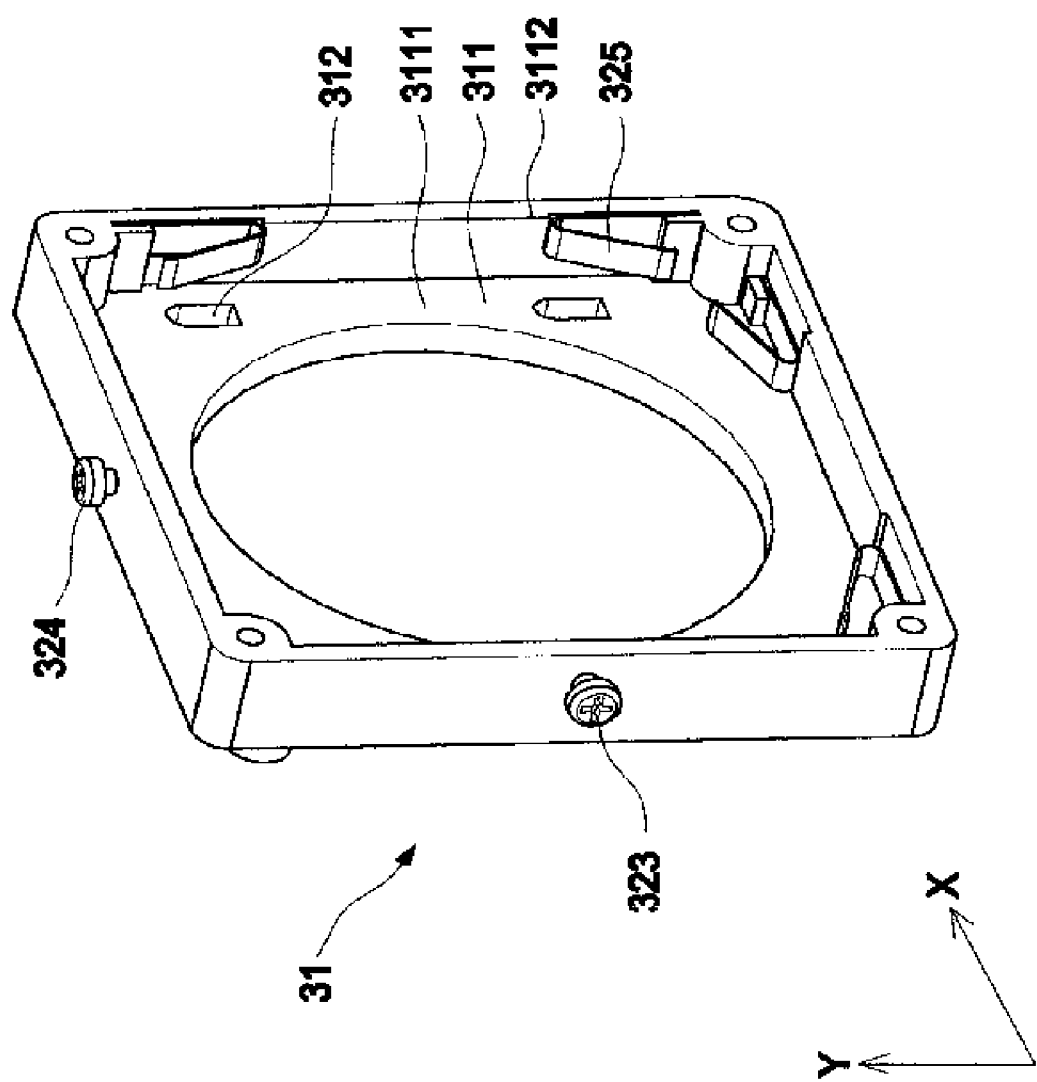
FIG. 8B is a perspective view showing a base of the second embodiment of the present invention.

Referring to FIG. 7, FIG. 8A and FIG. 8B, an adjusting apparatus 30 for a projection lamp comprises a base 31, an adjusting module 32, and a cover 33. The adjusting module 32 connects to a lamp 34.

The base 31 is a rectangular body, and the central part of the base 31 has a container 311 (shown in FIG. 8B) slightly bigger than the dimensions of the adjusting module 32. A bottom 3111 of the container 311 has a plurality of Y-axis rectangular guide-grooves 312.

The adjusting module 32 is placed inside the container 311 of the base 31, which comprises an X-axis adjusting plate 321, a Y-axis adjusting plate 322. An X-axis guide-pins 3211 and X-axis rectangular guide-grooves 3221 are respectively installed on the X-axis adjusting plate 321 and Y-axis adjusting plate 322. A surface 3222 of the Y-axis adjusting plate 322, which faced the bottom 3111 of the container 311, forms Y-axis guide-pins 3223 in accordance with the Y-axis rectangular guide-grooves 312. By placing the guide-pins into the guide-grooves, the Y-axis adjusting plate 322 connects with the base 31, and the X-axis adjusting plate 321 connects with Y-axis adjusting plate 322. The X-axis adjusting plate 321 is screwed to one end of the illumination lamp 34 by means of the bolts.

The cover 33 is screwed to a top surface 3112 of the container 311 of the base 31 and the central part of the cover 33 has a window 331. The dimensions of the window 331 are smaller than the dimensions of the adjusting plates 321 and 322 so that limits the adjusting apparatus 32 to move inside the container 311.

In addition, the adjacent surfaces of the base 31 respectively have an X-axis adjusting opening 313 and a Y-axis adjusting opening 314 passed by an X-axis adjusting device 323 and a Y-axis adjusting device 324 each to adjust the X-axis and the Y-axis displacement of the lamp 34. The X-axis adjusting device 323 is parallel to the length direction of the X-axis rectangular guide-grooves 3221 and is screwed to the X-axis adjusting opening 313, which has one end pressed to a side surface 3212 of the X-axis adjusting plate 321. The Y-axis adjusting device 324 is parallel to the length direction of the Y-axis rectangular guide-grooves 312 and is screwed to the Y-axis adjusting opening 314, which has one end pressed to a side surface 3224 of the Y-axis adjusting plate 322. Side surfaces of the base 31 in accordance with the adjusting device 323 and 324 have repositioning devices 325. One end of the repositioning device 325 is fixed to the side surface of the base 31 and the other end is pressed to the side surface 3213 and 3214 of the adjusting plates 321 and 322. The repositioning devices 225 could be elastic elements or springs.

Figure 9:
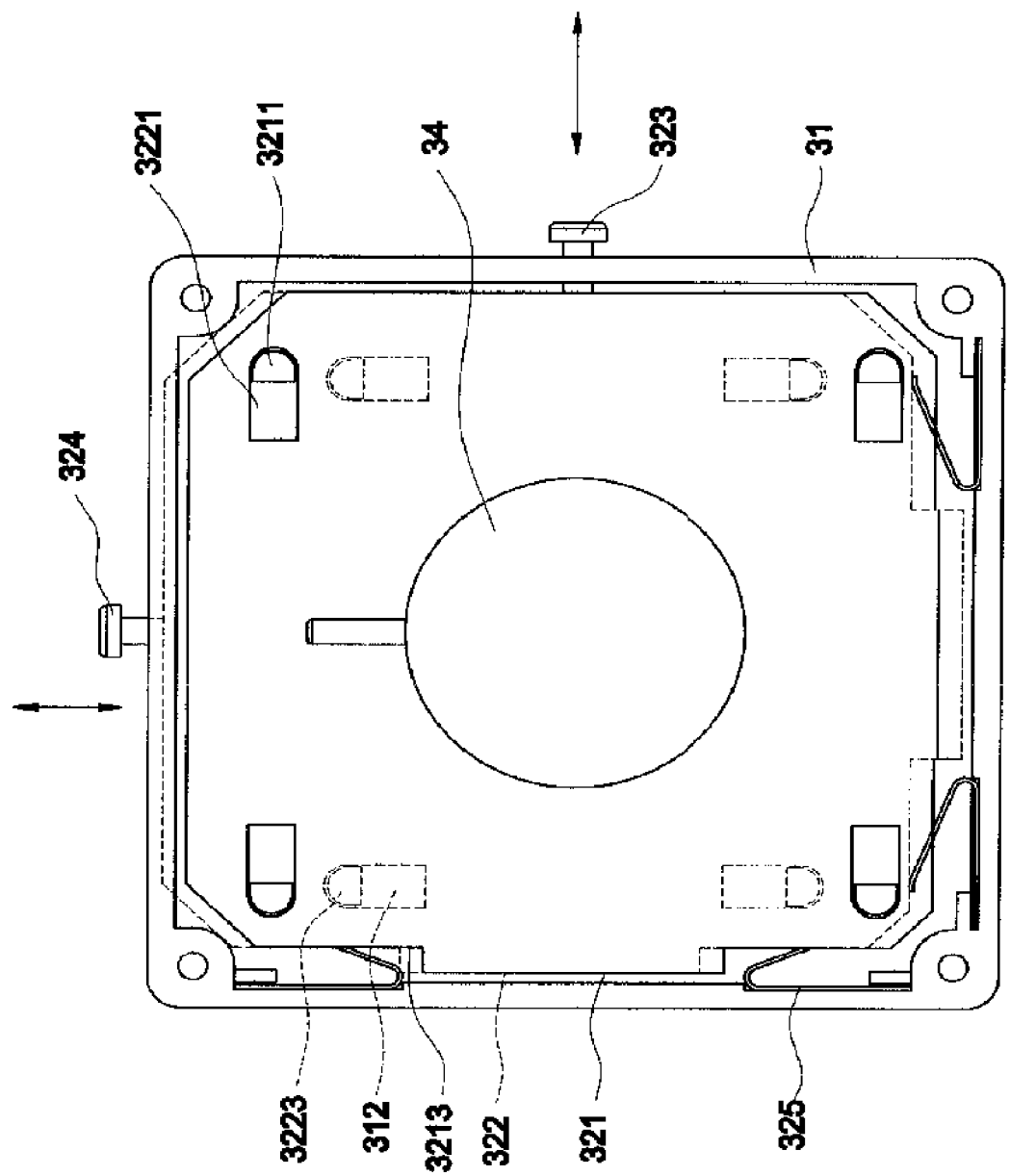
FIG. 9 is schematic view showing the motion of an adjusting apparatus for a projection lamp of the second embodiment of the present invention.

Referring to FIG. 9, as rotating the X-axis adjusting device 323, the X-axis adjusting device 323 pushes the X-axis adjusting plate 321. Due to the X-axis guide-pins 3211 are limited to move inside the X-axis rectangular guides-grooves 3221, the lamp 34 moves forward along the length direction of the X-axis rectangular guides-grooves 3221 to adjust the X-axis displacement of the lamp 34. Meanwhile, the side surface 3212 of the adjusting plate 321 compresses the repositioning devices 325. On the contrary, when reversely rotating the X-axis adjusting device 323, the repositioning devices 325 elastically push the X-axis adjusting plate 321 and push the lamp 34 to reversal displacement along the X-axis. As pressing the Y-axis adjusting device 324 to make the Y-axis adjusting device 324 push the Y-axis adjusting plate 322. Due to the Y-axis guide-pins 3223 are limited to move inside the Y-axis rectangular guides-grooves 312 and push the lamp 34 forward along the length direction of the Y-axis rectangular guides-grooves 312 to adjust the Y-axis displacement of the lamp 34. Meanwhile, the side surface 3224 of the adjusting plate 322 is pressed to the repositioning devices 325. On the contrary, reversal pressing the Y-axis adjusting device 324, by means of the repositioning devices 325 electrically pushes the Y-axis adjusting plate 322 and pushes the lamp 34 to reversal displacement along the Y-axis. As a result of above-mentioned that can adjust the lamp axis displacement.

The Third Embodiment

Figure 10:
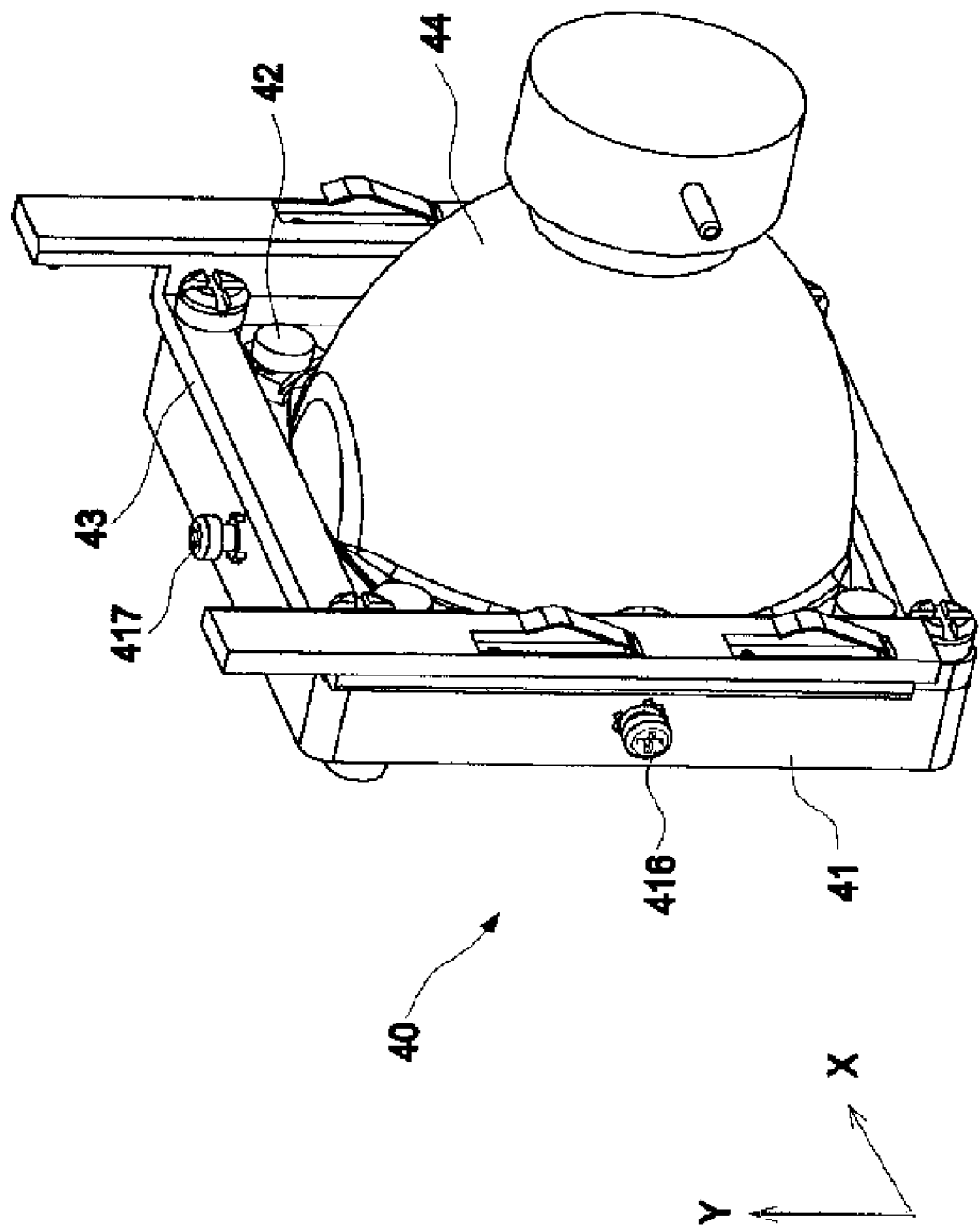
FIG. 10 is a perspective view showing an adjusting apparatus for a projection lamp of the third embodiment of the present invention.
Figure 11A:
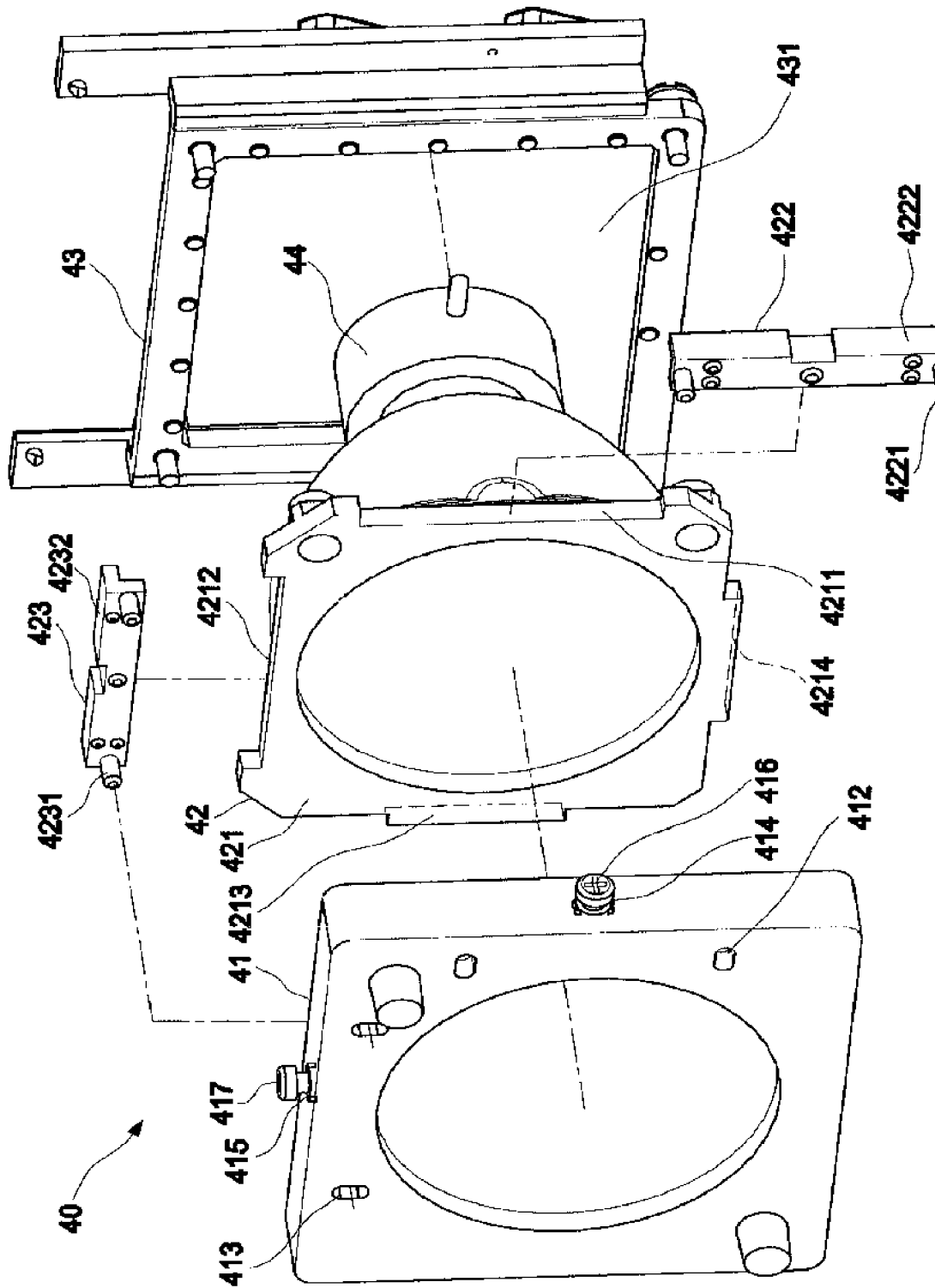
FIG. 11A is an explored view showing an adjusting apparatus for a projection lamp of the third embodiment of the present invention.
Figure 11B:
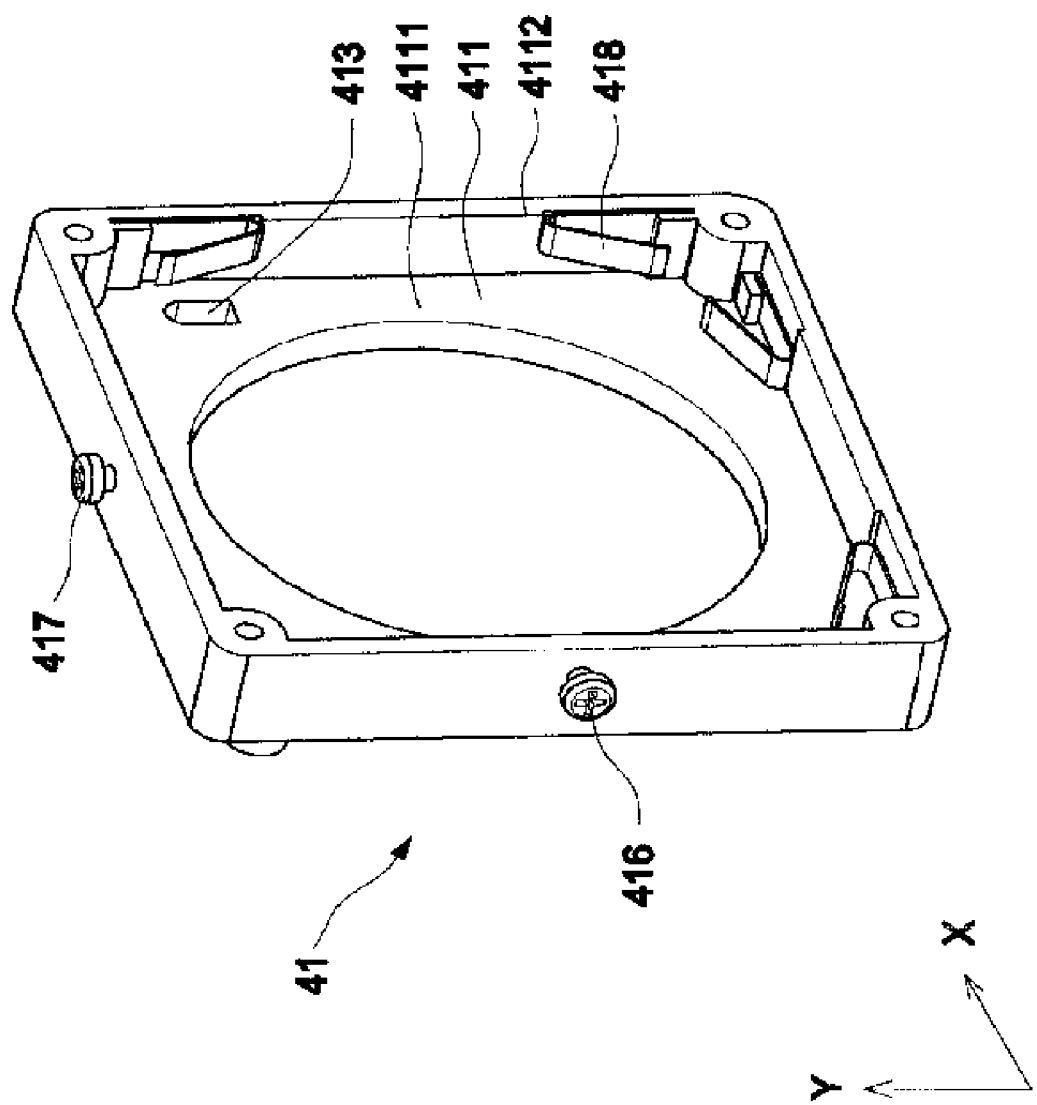
FIG. 11B is a perspective view showing a base of the third embodiment of the present invention.

Referring to FIG. 10, FIG. 11A, and 11B, an adjusting apparatus 40 for a projection lamp comprises a base 41, an adjusting module 42, and a cover 43. The adjusting module 42 connects to a lamp 44.

The base 41 is a rectangular body, and the central part of the base 41 has a container 411 (shown in FIG. 11B) slightly bigger than the dimensions of the adjusting module 42. A bottom 4111 of the container 411 has a plurality of X-axis rectangular guide-grooves 412 and Y-axis rectangular guide-grooves 413.

The adjusting module 42 is placed inside the container 411 of the base 41, which comprises a fixing plate 421, an X-axis adjusting plate 422, and a Y-axis adjusting plate 423. Adjacent side surfaces of the fixing plate 421 have an X-axis slide-groove 4211 and a Y-axis slide-groove 4212. And the fixing plate 421 is connected to one end of the lamp 44. The X-axis adjusting plate 422 and the Y-axis adjusting plate 423 are like L-shape, which have one end inside the accordance slid-groove and connect to the fixing plane 421. The dimensions of the adjusting plates 422 are smaller than the dimensions of the slide-grooves so that the adjusting plates can slide inside the slide-grooves. Upon the X-axis adjusting plate 422 and Y-axis adjusting plate 423 forms an X-axis guide-pins 4221 and Y-axis guide-pins in accordance with the X-axis rectangular guide-grooves 412 and the Y-axis rectangular guide-grooves 413. By assembling the guide-pins into the guide-grooves, the base 41 and the adjusting module 42 are combined.

The cover 43 is screwed to a top surface 4112 of the container 411 of the base 41, and the central part of the cover 43 has a window 431. The dimensions of the window 431 are smaller than the dimensions of the fixing plate 421 so that limits the adjusting apparatus 42 to move inside the container 411.

In addition, the adjacent surfaces of the base 41 respectively have an X-axis adjusting opening 414 and a Y-axis adjusting opening 415 passed by an X-axis adjusting device 416 and a Y-axis adjusting device 417 each to adjust the X-axis and the Y-axis displacement of the lamp 44. The X-axis adjusting device 416 is parallel to the length direction of the X-axis rectangular guide-grooves 412 and is screwed to the X-axis adjusting opening 414, which has one end pressed to a side surface 4222 of the X-axis adjusting plate 422. The Y-axis adjusting device 417 is parallel to the length direction of the Y-axis rectangular guide-grooves 413 and is screwed to the Y-axis adjusting opening 415, which has one end pressed to a side surface 4232 of the Y-axis adjusting plate 423. The side surfaces of base 41 in accordance with the adjusting device 416 and 417 have repositioning devices 418. One end of the repositioning devices 418 is fixed to the side surfaces of the base 41 and the other end is pressed to the side surface 4213 and 4214 of the fixing plate 421. The repositioning devices 418 could be elastic elements (shown in FIG. 11B), springs, and plastic devices or formed by elastic deformation side frames of the base 41.

Figure 12:
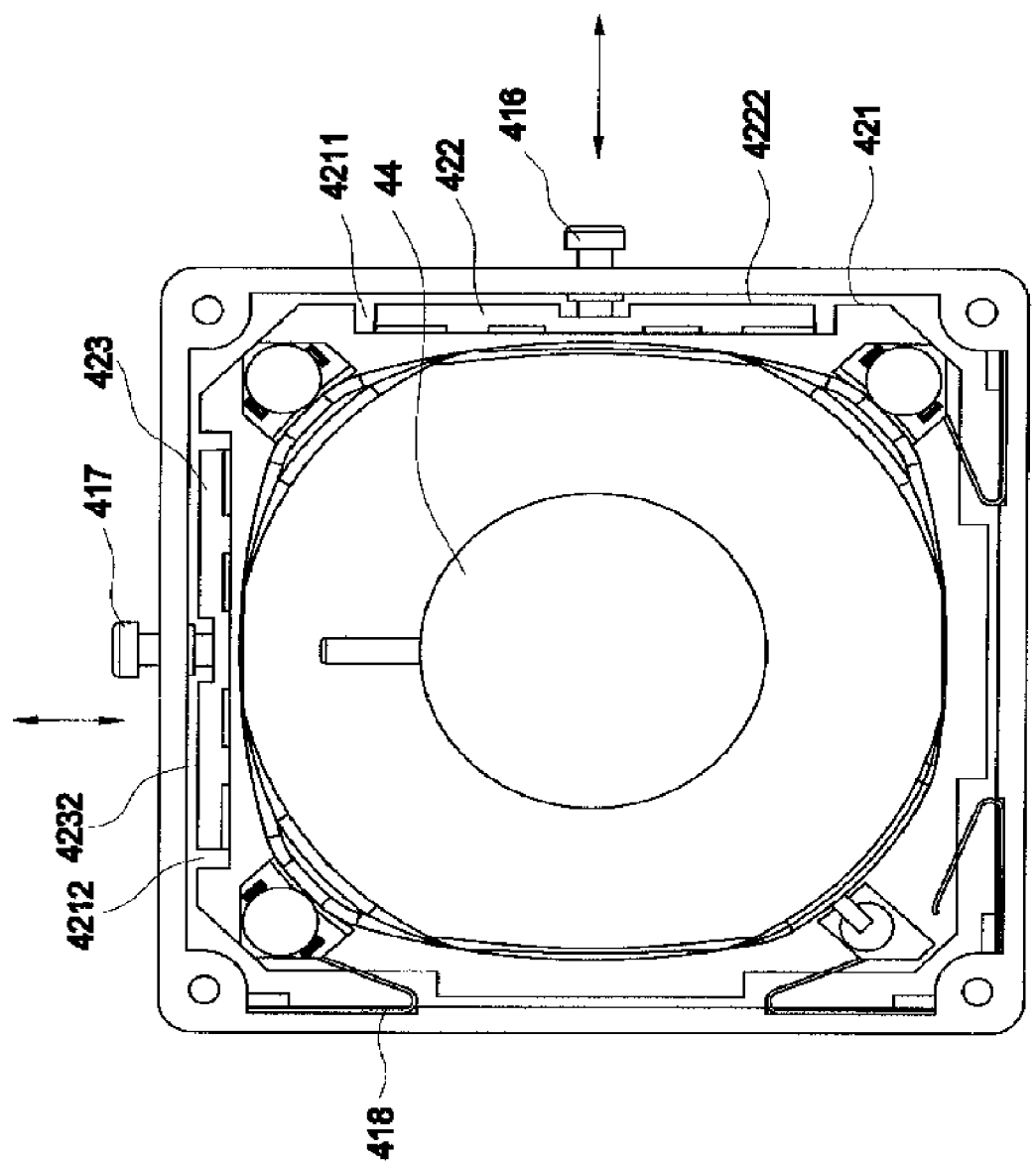
FIG. 12 is an schematic view showing the motion of an adjusting apparatus for a projection lamp of the third embodiment of the present invention.
Figure 13:
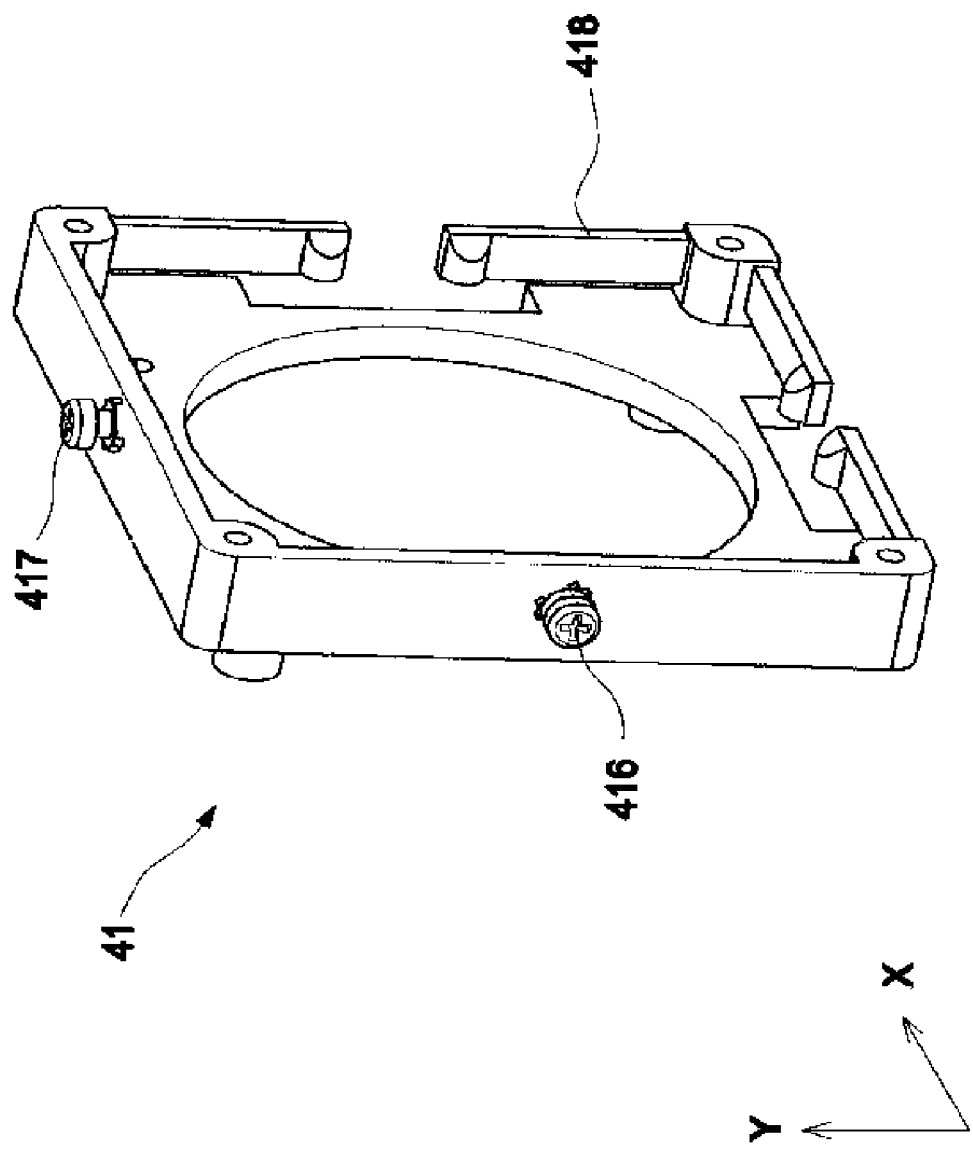

Referring to FIG. 12, as rotating the X-axis adjusting device 416, the X-axis adjusting device 416 pushes the X-axis adjusting plate 422. Due to the X-axis guide-pins 4221 are limited to move inside the X-axis rectangular guides-grooves 412, the lamp 44 moves forward along the length direction of the X-axis rectangular guides-grooves 421 to adjust the X-axis displacement of the lamp 44. Meanwhile, the side surface 4213 of the fixing plate 421 compresses the repositioning devices 418. On the contrary, when reversely rotating the X-axis adjusting device 416, the repositioning devices 418 elastically push the fixing plate 421 and push the lamp 44 to reversal displacement. As pressing the Y-axis adjusting device 417 to make the Y-axis adjusting device 417 push the Y-axis adjusting plate 423. Due to the Y-axis guide-pins 4231 are limited to move inside the Y-axis rectangular guides-grooves 413 and push the lamp 44 forward along the length direction of the Y-axis rectangular guides-grooves 413 to adjust the Y-axis displacement of the lamp 44. Meanwhile, the side surface 4214 of the fixing plate 421 is pressed to the repositioning devices 418. On the contrary, reversal pressing the Y-axis adjusting device 417, by means of the repositioning devices 418 electrically pushes the fixing plate 421 and pushes the lamp 44 to reversal displacement. As a result of above-mentioned that can adjust the lamp axis displacement to precisely focus the light of the lamp and reduce the illumination loss.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. An adjusting apparatus for a projection lamp, comprising:
    a base which has two adjusting devices on side surfaces and has a container with at least one guide-groove on the bottom;
    an adjusting module which is placed inside said container, one end of said adjusting device pressing to a surface of said adjusting module which comprises two adjusting plates, guide-grooves and guide-pins being formed upon said adjusting plate, one adjusting plate placing said guide-pins in accordance with said guide-grooves of said base, the other adjusting plate connecting to a lamp; and
    a cover which is placed on a top surface of said container;
    wherein said adjusting devices are moved parallel to the length direction of said guide-grooves.

2. The adjusting apparatus for a projection lamp according to claim 1, wherein said cover has a window, the dimensions of said window being smaller than the dimensions of said adjusting plate.

3. The adjusting apparatus for a projection lamp according to claim 1, wherein said guide-grooves have repositioning devices inside, two ends of said repositioning device respectively pressing to said guide-pin and to a surface of said guide groove.

4. The adjusting apparatus for a projection lamp according to claim 3, wherein said repositioning devices are springs.

5. An adjusting apparatus for a projection lamp, comprising:
    a base which has at least one adjusting device on a side surface and has a container with at least one guide-groove on the bottom;
    an adjusting module placed inside said container, which comprises two adjusting plates, guide-grooves and guide-pins being formed upon said adjusting plate, one adjusting plate placing said guide-pins in accordance with said guide-grooves of said base, the other adjusting plate connecting to a lamp; and a cover which is placed on a top surface of said container; wherein said adjusting devices are moved parallel to the length direction of said guide-grooves.

6. The adjusting apparatus for a projection lamp according to claim 5, wherein said cover has a window, the dimensions of said window being smaller than the dimensions of said adjusting plate.

7. The adjusting apparatus for a projection lamp according to claim 5, wherein one end of said adjusting device is pressed to said adjusting plate, on side surfaces of said base having at least one repositioning device in accordance with the position of said adjusting device, one end of said repositioning device being fixed to side surface of said base, and the other end pressing to side surface of said adjusting plate.

8. The adjusting apparatus for a projection lamp according to claim 7, wherein said repositioning device is a spring.

9. The adjusting apparatus for a projection lamp according to claim 7, wherein said repositioning device is an elastic element.

10. An adjusting apparatus for a projection lamp, comprising:

a base which has at least one adjusting device on a side surface and has a container with at least one guide-groove on the bottom;

an adjusting module placed inside said container, which comprises a fixing plate and two adjusting plates, one end of said adjusting device pressing to a side surface of said adjusting plate, adjacent surfaces of said fixing plate having slide-grooves and connecting to a lamp, said adjusting plate placed inside said slide-groove, and placing guide-pins in accordance with said guide-grooves; and a cover which is placed on a top surface of said container.

11. The adjusting apparatus for a projection lamp according to claim 10, wherein said adjusting devices are moved parallel to the length direction of said guide-grooves.

12. The adjusting apparatus for a projection lamp according to claim 10, wherein said cover has a window, the dimensions of said window being smaller than the dimensions of said adjusting plate.

13. The adjusting apparatus for a projection lamp according to claim 10, wherein on side surfaces of said base have at least one repositioning device in accordance with the position of said adjusting device, one end of said repositioning device being fixed to side surface of said base and the other end pressing to side surface of said fixing plate.

14. The adjusting apparatus for a projection lamp according to claim 13, wherein said repositioning device is a spring.

15. The adjusting apparatus for a projection lamp according to claim 13, wherein said repositioning device is an elastic element.

16. The adjusting apparatus for a projection lamp according to claim 13, wherein said repositioning device is a plastic device.

17. The adjusting apparatus for a projection lamp according to claim 13, wherein said repositioning device is an elastic deformation frame of said base.

18. An adjusting apparatus for a projection lamp, comprising:

a base which has two adjusting devices on side surfaces and has a container with at least one guide-groove on the bottom;

an adjusting module which is placed inside said container, one end of said adjusting device pressing to a surface of said adjusting module which comprises two adjusting plates, guide-grooves and guide-pins being formed upon said adjusting plate, one adjusting plate placing said guide-pins in accordance with said guide-grooves of said base, the other adjusting plate connecting to a lamp; and a cover which is placed on a top surface of said container; wherein said guide-grooves have repositioning devices inside, two ends of said repositioning device respectively pressing to said guide-pin to a surface of said guide groove.

19. An adjusting apparatus for a projection lamp, comprising:

a base which has at least one adjusting device on a side surface and has a container with at least one guide-groove on the bottom;

an adjusting module placed inside said container, which comprises two adjusting plates, guide-grooves and guide-pins being formed upon said adjusting plate, one adjusting plate placing said guide-pins in accordance with said guide-grooves of said base, the other adjusting plate connecting to a lamp, wherein one end of said adjusting device is pressed to said adjusting plate, on side surfaces of said base having at least one repositioning device in accordance with the position of said adjusting device, one end of said repositioning device being fixed to side surface of said base, and the other end pressing to side surface of said adjusting plate; and a cover which is placed on a top surface of said container.

* * * * *